US008473621B2

(12) United States Patent
Li et al.

(10) Patent No.: US 8,473,621 B2
(45) Date of Patent: Jun. 25, 2013

(54) METHOD, SYSTEM, AND APPARATUS FOR CREATING CONTENT-ON-DEMAND SERVICE

(75) Inventors: Jincheng Li, Shenzhen (CN); Dongming Zhu, Shenzhen (CN); Jianfeng Zhong, Shenzhen (CN); Geng Wang, Shenzhen (CN); Xiao Wang, Shenzhen (CN); Shumin Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 343 days.

(21) Appl. No.: 12/892,608

(22) Filed: Sep. 28, 2010

(65) Prior Publication Data

US 2011/0023071 A1 Jan. 27, 2011

Related U.S. Application Data

(63) Continuation of application No. PCT/CN2009/070730, filed on Mar. 11, 2009.

(30) Foreign Application Priority Data

Mar. 28, 2008 (CN) .......................... 2008 1 0090365

(51) Int. Cl.
*G06F 15/16* (2006.01)
(52) U.S. Cl.
USPC .......................................... 709/227; 709/246
(58) Field of Classification Search
USPC .................................. 709/227, 246
See application file for complete search history.

(56) References Cited

U.S. PATENT DOCUMENTS

| | | | | |
|---|---|---|---|---|
| 7,680,143 | B2* | 3/2010 | Jabri et al. | 370/437 |
| 8,150,975 | B2* | 4/2012 | Li et al. | 709/227 |
| 2004/0125757 | A1 | 7/2004 | Mela et al. | |
| 2004/0184432 | A1 | 9/2004 | Gateva et al. | |
| 2008/0084867 | A1* | 4/2008 | Foti et al. | 370/352 |
| 2008/0151918 | A1 | 6/2008 | Foti | |
| 2009/0313376 | A1* | 12/2009 | Cedervall et al. | 709/227 |

FOREIGN PATENT DOCUMENTS

| | | |
|---|---|---|
| CN | 1487700 A | 4/2004 |
| CN | 1741633 A | 3/2006 |
| WO | WO 2007/140812 A1 | 12/2007 |

OTHER PUBLICATIONS

Chinese Office Action, Chinese Application No. 200810090365.2, Date of mailing: Dec. 22, 2010, 15 pages.
3rd Generation Partnership Project, "Universal Mobile Telecommunications System (UMTS): Transparent end-to-end Packet-switched Streaming Service (PSS); Protocols and codecs," 3GPP TS 26.234, Version 6.6.0, release 6, Dec. 2005, pp. 1-128.

(Continued)

*Primary Examiner* — Asghar Bilgrami
(74) *Attorney, Agent, or Firm* — Slater & Matsil, L.L.P.

(57) ABSTRACT

A method, a system, and an apparatus for creating a Content-on-Demand (CoD) service are disclosed herein. The method includes receiving a Session Initiation Protocol (SIP) service request sent by a User Equipment (UE); converting the SIP service request into a Real-Time Streaming Protocol (RTSP) service request, and sending the RTSP service request to a server; receiving an RTSP service response sent by the server; and converting the RTSP service response into a SIP service response, and sending the SIP service response to the UE to create the CoD service between the UE and the server.

17 Claims, 8 Drawing Sheets

OTHER PUBLICATIONS

Extended European Search Report, European Application No. 09724347.1-1244/2262199, Applicant: Huawei Technologies Co., Ltd., Dated: Jul. 7, 2011, 16 pages.
International Search Report, International application No. PCT/CN2009/070730, Date of mailing May 7, 2009, 4 pages.
English Translation of Written Opinion of the International Searching Authority, International application No. PCT/CN2009/070730, Date of mailing May 7, 2009, 3 pages.
ETSI, "Telecommunications and Internet converged Services and Protocols for Advanced Networking (TISPAN); IPTV Architecture; IPTV functions supported by the IMS subsystem," draft ETSI TS 182 027 v0.0.3, Technical Specification, Reference: DTS/TISPAN-02048-NGN, Nov. 2006, 18 pages.
"3rd Generation Partnership Project; Technical Specification Group Services and System Aspects; Transparent end-to-end packet switched streaming service (PSS); General Description (Release 7)," 3GPP TS 26.233 v7.0.0, Technical Specification, Jun. 2007, 14 pages.
"3rd Generation Partnership Project; Technical Specification Group Services and System Aspects; Transparent end-to-end packet switched streaming service (PSS); Protocols and codecs (Release 7)," 3GPP TS 26.234 v7.4.0, Technical Specification, Sep. 2007, 150 pages.
ETSI, "Telecommunications and Internet converged Services and Protocols for Advanced Networking (TISPAN); IPTV Architecture; IPTV functions supported by the IMS subsystem," ETSI TS 182 027 v2.0.0, Technical Specification, Reference: DTS/TISPAN-02048-NGN-R2, Feb. 2008, 57 pages.
Chinese Office Action, Chinese Application No. 200810090365.2, Date of mailing: Jul. 19, 2010, 14 pages.

* cited by examiner

METHOD, SYSTEM, AND APPARATUS FOR CREATING CONTENT-ON-DEMAND SERVICE

This application is a continuation of co-pending International Application No. PCT/CN2009/070730, filed Mar. 11, 2009, which designated the United States and was not published in English, and which claims priority to Chinese Application No. 200810090365.2, filed Mar. 28, 2008, both of which applications are incorporated herein by reference.

TECHNICAL FIELD

The present invention relates to data communication technologies, and in particular, to a method, a system and an apparatus for creating a Content-on-Demand (CoD) service.

BACKGROUND

Nowadays, the communication and Information Technology (IT) technologies are developing rapidly. With the emergence of the Internet Protocol (IP) technology that crosses the link-layer transmission media, the Internet applications are popularized rapidly. People are not satisfied with a single voice communication mode any longer, but require brand-new multimedia communication. Therefore, the IP-based mobile communication network, the IP-based fixed communication network, and the convergence of the Internet and the telecom network have become a megatrend in the industry indisputably. In order to meet more and more requirements of IP multimedia applications, the 3rd Generation Partnership Project (3GPP) introduces an IP based Multimedia Subsystem (IMS) in full-IP service network architecture on the basis of the packet bearer network.

The IMS is a subsystem added in the 3GPP R5 stage and overlaid on the existing packet domain in a Wide-band Code Division Multiple Access (WCDMA) network. The IMS uses the packet domain as a bearer channel of its upper-layer control signaling and media, and introduces Session Initiation Protocol (SIP) as a service control protocol. With simplicity and extensibility of the SIP and easy combination of media, the IMS separates the service control from the bearer control, and provides diversified multimedia services.

Main functional entities of the IMS include Call Session Control Function (CSCF) that controls user registration and sessions, Application Server (AS) that provides various service logic control functions, Home Subscriber Server (HSS) that manages subscription data in a centralized way, and Media Gateway Control Function (MGCF)/IP Multimedia Media Gateway Function (IM-MGW) for interworking with the circuit switching network. A user accesses the IMS through the current Proxy Call Session Control Function (P-CSCF). The home-domain Serving Call Session Control Function (S-CSCF) in the registration area of the user is responsible for controlling sessions and the triggering of service, and controlling the service interaction with the AS.

With perfection of the IMS protocol, the IMS based Internet Protocol Television (IPTV) service is developing rapidly. The IMS based IPTV service provides a user with streaming services and the multimedia service that integrates the streaming media with the real-time session service by making full use of the existing mechanisms in the IMS network, for example, registration, authentication, routing, session control and setup, service triggering, charging, and end-to-end Quality of Service (QoS) assurance.

FIG. 1 shows IMS based IPTV service function architecture defined by the Telecommunication and Internet converged Services and Protocols for Advanced Networking (TISPAN), in which an IPTV media server (that is, MF or Media Function) is responsible for controlling and delivering the media streams directed to User Equipment (UE). An IPTV media server is functionally divided into a Media Control Function (MCF) and a Media Delivery Function (MDF). A Service Selection Function (SSF) is responsible for providing the user with available IPTV service information. A Service Control Function (SCF) is responsible for controlling or executing IPTV service logic. The SCF and the MCF are capable of dynamically selecting a media server for an IPTV service requested by the user.

The session creation and media negotiation of the IPTV system are performed through collaboration between the SIP protocol and other protocols such as Realtime Transport Protocol (RTP)/Real-time Transport Control Protocol (RTCP), Session Description Protocol (SDP), Real-Time Streaming Protocol (RTSP), and Domain Name Server (DNS).

The 3GPP has developed specifications of "Transparent End-to-End Packet Switched Streaming Service (PSS)" (that is, PSS Specifications). The PSS Specifications employ a client-server mode. The client (streaming client) communicates with the media server (content server) through GSM EDGE Radio Access Network (GERAN)/UMTS Terrestrial Radio Access Network (UTRAN), 3GPP Core Network, and IP network. In the PSS Specifications, the client creates an RTSP session with the media server through RTSP to negotiate the RTP media delivery channel and receive the media content. The client may send operation commands such as fast-forward and fast-reverse through the RTSP channel to control transmission of media streams.

In the 3GPP specifications, the service control protocol is RTSP rather than the IMS based SIP. Therefore, it is impossible for a SIP-based IMS mobile terminal to join the streaming service effectively. Consequently, the user is unable to enjoy streaming services by making full use of the rich functions provided by the IMS system, for example, uniform user management, QoS control, policy control, charging control, and session setup mechanism. Therefore, the service operation cost of the service provider is increased, and the user experience is deteriorated.

SUMMARY OF THE INVENTION

The embodiments of the present invention provide a method, a system, and an apparatus for creating a CoD service. In the process of creating the CoD service, the SIP message and the RTSP message are converted to accomplish message interworking, so that the SIP-based IMS mobile terminal can enjoy the streaming service effectively, the user experience is improved, and the services are diversified.

A method for creating a CoD service in an embodiment of the present invention includes receiving a Session Initiation Protocol (SIP) service request sent by a UE. The SIP service request is converted into an RTSP service request, which is sent to a server. An RTSP service response is sent by the server. The RTSP service response is converted into a SIP service response, which is sent to the UE to create the CoD service between the UE and the server.

A system for creating a CoD service in an embodiment of the present invention includes a Protocol Transforming Function (PTF), which is configured to convert a SIP message into an RTSP message or convert an RTSP message into a SIP message; and a content server, which is configured to receive and process an RTSP service message and send a media stream to a UE.

A PTF provided in an embodiment of the present invention includes an information receiving module that is configured to receive a SIP service request and an RTSP service response. An information converting module is configured to convert the SIP service request received by the information receiving module into an RTSP service request, and to convert the RTSP service response received by the information receiving module into a SIP service response. An information sending module is configured to send the RTSP service request and the SIP service response converted by the information converting module.

A UE provided in an embodiment of the present invention includes an information receiving module that is configured to receive a SIP service response and obtain RTSP change information. A parameter adjusting module is configured to adjust RTSP parameters according to the RTSP change information obtained by the information receiving module.

The technical solution under embodiments of the present invention brings a number of benefits. Through the method and the apparatus for creating a CoD service, the SIP message and the RTSP message are converted in the process of creating the CoD service in order to accomplish message interworking; the SIP-based IMS mobile terminal can enjoy the streaming service effectively. Therefore, the user experience is improved, and the services are diversified.

DETAILED DESCRIPTION OF ILLUSTRATIVE EMBODIMENTS

The embodiments of the present invention put forward a system and a method for enabling a SIP-based mobile terminal to enjoy streaming services under control of IMS on the basis of the existing specifications of TISPAN and 3GPP, and apply the IMS to the mobile terminal environment.

Figure 1:
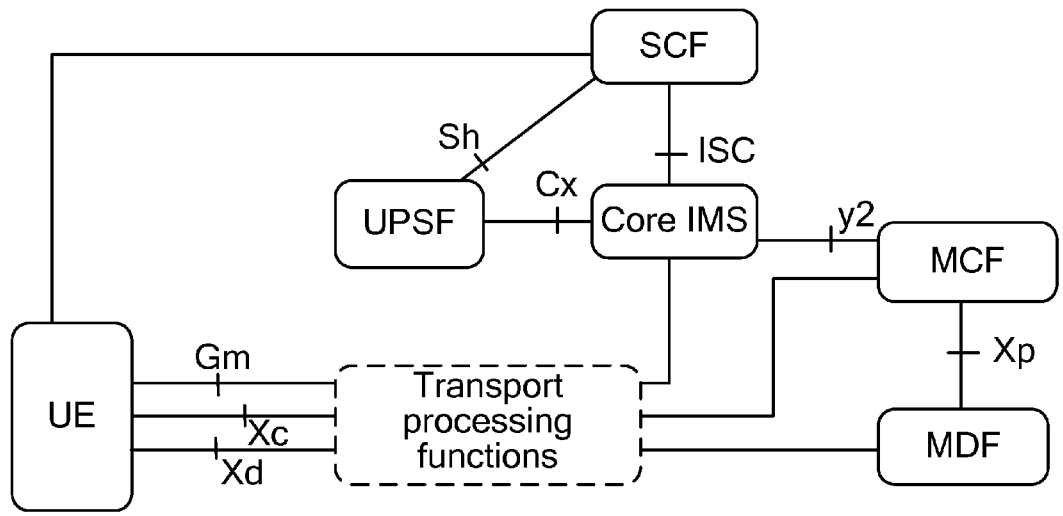
FIG. 1 shows IMS based IPTV service function architecture defined by the TISPAN in the prior art.
Figure 2:
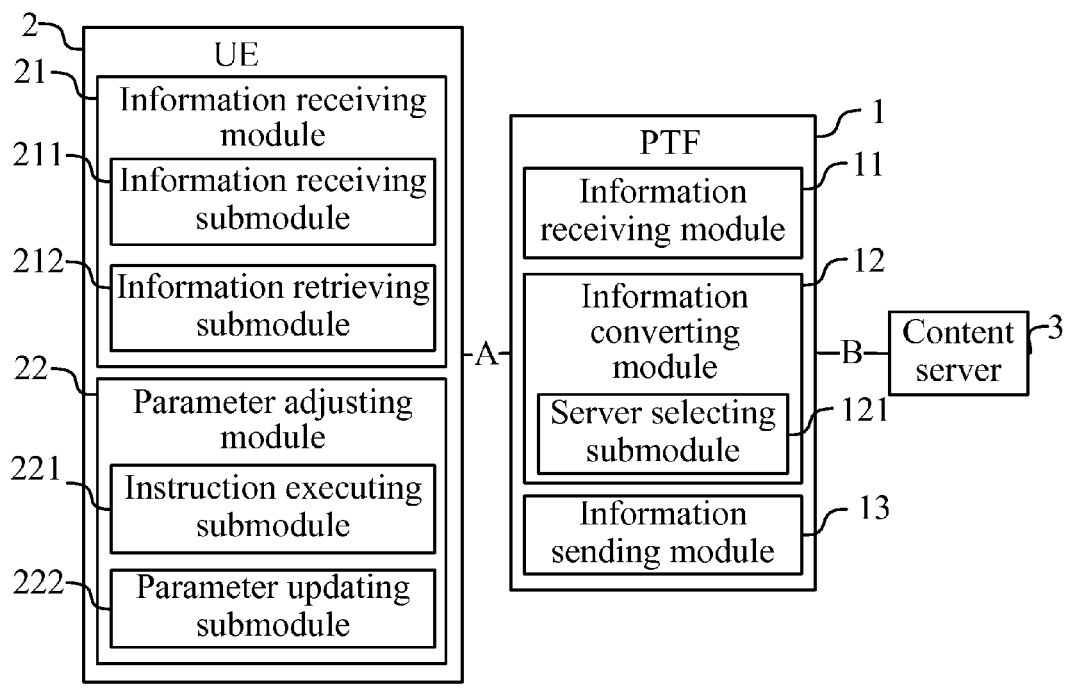
FIG. 2 shows system architecture in Embodiment 1 of the present invention, in which a PTF is introduced.

The implementation of the present invention is described in more detail below with reference to accompanying drawings and preferred embodiments. FIG. 2 shows system architecture in Embodiment 1 of the present invention, in which a Protocol Transforming Function (PTF) is introduced.

In this system, a PTF 1 is introduced for converting a SIP message into an RTSP message or for converting an RTSP message into a SIP message. The PTF 1 includes an information receiving module 11 that is configured to receive a SIP service request and an RTSP service response, or receive an RTSP PLAY message. An information converting module 12 is configured to convert the SIP service request received by the information receiving module 11 into an RTSP service request, and to convert the RTSP service response received by the information receiving module into a SIP service response. An information sending module 13 is configured to send the RTSP service request and the SIP service response converted by the information converting module 12, or send the RTSP PLAY message, or forward the received RTSP PLAY message.

It should be noted that in the PTF 1 above, the function of receiving the RTSP PLAY message or sending the RTSP PLAY message or forwarding the received RTSP PLAY message may be performed or not, depending on the specific settings. The solution deriving from variation of the foregoing implementation shall also be covered in the protection scope of the present invention.

The information converting module 12 includes a server selecting submodule 121 that is configured to select a server that provides services for a UE according to the SIP service request received by the information receiving module.

The PTF 1 receives the SIP message from UE 2 through A-interface, converts the message into the corresponding RTSP message, and then forwards the message to the content server 3 through B-interface. Conversely, the PTF 1 receives the RTSP message from the content server 3 through B-interface, converts the message into the corresponding SIP message, and then forwards the message to UE 2 through A-interface.

Therefore, in FIG. 2, A-interface is based on SIP, and B-interface is based on RTSP.

The UE 2 in this system includes an information receiving module 21 that is configured to receive a SIP service response, and obtain RTSP change information. A parameter adjusting module 22 is configured to adjust RTSP parameters according to the RTSP change information obtained by the information receiving module 21.

The information receiving module 21 includes an information receiving submodule 211 that is configured to receive a SIP service response and an information retrieving submodule 212 that is configured to obtain the RTSP change information from the SIP service response received by the information receiving submodule 21.

The parameter adjusting module 22 includes an instruction executing submodule 221 that is configured to perform the operation indicated by an operation instruction when the RTSP change information is the operation instruction, where the RTSP change information is carried in the SIP service response received by the information receiving module 21. A parameter updating submodule 222 is configured to update RTSP parameters according to parameter information when the RTSP change information is the parameter information, where the RTSP change information is carried in the SIP service response received by the information receiving module 21.

The content server 3 is configured to handle RTSP messages, and/or provide media content for UE 2.

The UE 2 is configured to send a SIP service request, receive a service response, and receive media content.

In practice, the PTF may be stand-alone, or deployed on another functional entity, as described in Embodiment 2 and Embodiment 3 of the present invention.

The content server deployed in the PSS system is a PSS content server. The content server deployed in the TISPAN IPTV system is an MF, which is logically divided into a Media Control Function (MCF) and/or a Media Delivery Function (MDF).

Figure 3:
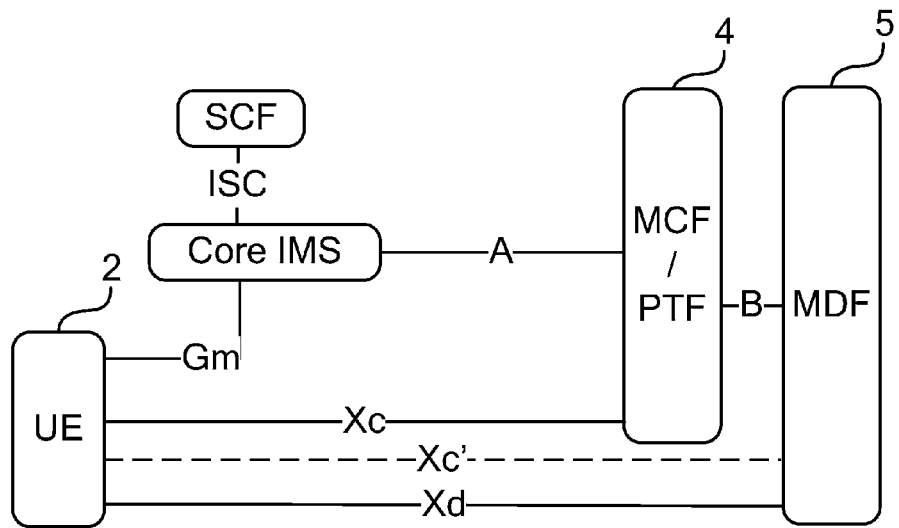
FIG. 3 shows system architecture in Embodiment 2 of the present invention, in which a PTF is deployed on an MCF.

FIG. 3 shows system architecture in Embodiment 2 of the present invention, in which a PTF is deployed on an MCF.

In this system, a PTF 1 is deployed on the MCF 4, and the MCF 4 is responsible for converting a SIP message into an RTSP message or converting an RTSP message into a SIP message.

The MCF 4 is configured to convert a SIP message into an RTSP message or convert an RTSP message into a SIP message. The MCF 4 receives the SIP message from UE 2 through A-interface, converts the message into the corresponding RTSP message, and then forwards the message to the MDF 5 through B-interface. Conversely, the MCF 4 receives the RTSP message from the MDF 5 through B-interface, converts the message into the corresponding SIP message, and then forwards the message to UE 2 through A-interface. Therefore, in FIG. 3, A-interface is based on SIP, and B-interface is based on RTSP.

In this embodiment, the MDF 5 implements functions of a PSS content server 3.

In the present invention, an RTSP media control channel is set up between the UE 2 and the network side for performing VCR control such as fast-forward and fast-reverse. The RTSP media control channel may be set up between the UE 2 and the MCF 4, for example, Xc interface; or set up between the UE 2 and the MDF 5, for example, Xc' interface.

Figure 4:
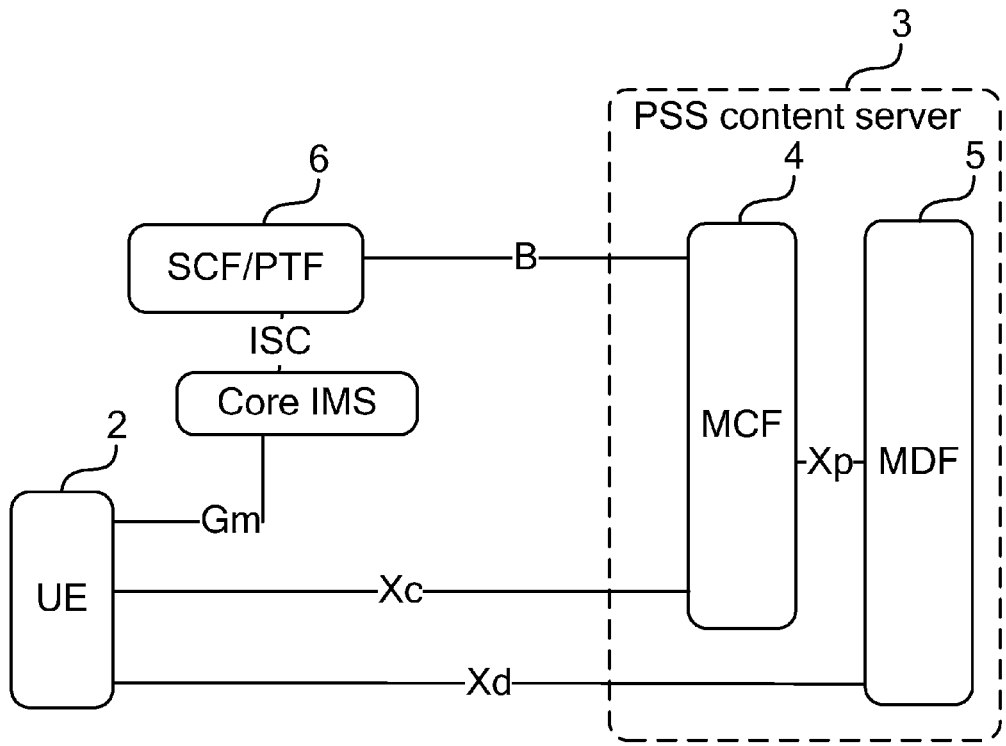
FIG. 4 shows system architecture in Embodiment 3 of the present invention, in which a PTF is deployed on an SCF.

FIG. 4 shows system architecture in Embodiment 3 of the present invention, in which the PTF is deployed on an SCF.

In this system, a PTF 1 is deployed on the SCF 6, and the SCF 6 is responsible for converting a SIP message into an RTSP message or converting an RTSP message into a SIP message.

The SCF 6 receives the SIP message from UE 2 through an ISC interface, converts the message into the corresponding RTSP message, and then forwards the message to the MCF 4 through B-interface. Conversely, the SCF 6 receives the RTSP message from the MCF 4 through B-interface, converts the message into the corresponding SIP message, and then forwards the message to UE 2 through the ISC interface.

In this embodiment, the MCF 4 and the MDF 5 work together to implement functions of a PSS content server 3.

The following embodiment further describes the process of creating a CoD service with reference to the systems provided in Embodiment 1 to Embodiment 3.

Figure 5:
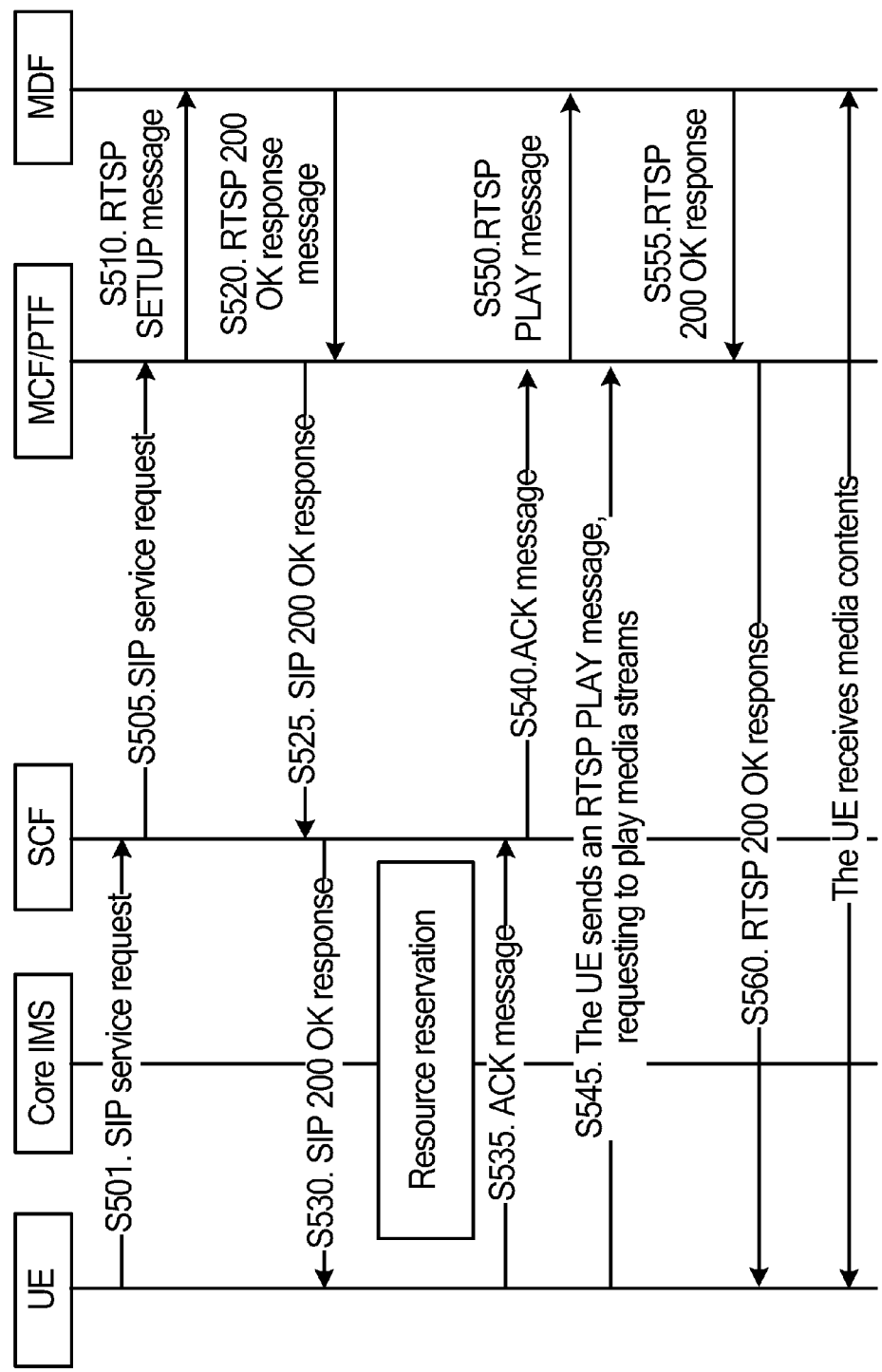
FIG. 5 is a flowchart of a method for creating a CoD service in Embodiment 4 of the present invention.

FIG. 5 is a flowchart of a method for creating a CoD service in Embodiment 4 of the present invention.

In this embodiment, for brevity of description, the system based on Embodiment 2 of the present invention is selected, the PTF 1 is deployed on the MCF 4, the media control channel is set up between the UE 2 and the MCF 4, and the UE 2 sends the first PLAY message as a request for playing the media streams.

In Step S501, the UE sends a SIP service request to request a CoD service.

The UE sends a SIP service request to request the CoD service. The request passes through the core IMS and arrives at the SCF. The SIP request is a SIP Invite request, SIP Reinvite request, or SIP Update request.

The request carries a CoD content identifier, which indicates the CoD program content expected by the user. The identifier may be obtained through EPG or a media description file, or by other means.

The request also carries SDP information, for example, IP address and port number of the UE with respect to the RTSP content control channel, and/or IP address and port number of the UE with respect to the RTP content delivery channel.

The request may carry capability information of the UE, for example, codec capabilities of the UE, screen size, software version; and/or user preference information, for example, the number of MFs compliant with conditions, and preferring low-priced to high-quality products.

The UE capability information and/or user preference information may be stored in a specific functional entity on the network side. Therefore, the service request of the UE may carry only an identifier of the functional entity, for example, IP address or URI of the functional entity; and the entity that will use such information in the future obtains such information from the storage entity corresponding to the identifier. The entities that will use the information in the future include SCF and MCF. The entities may perform necessary service control according to the UE capability information and/or user preference information, for example, select a proper media server.

The service request of the UE is routed to the SCF in mode 1 or mode 2 below, or combination thereof.

Mode 1: The service request is routed to the SCF according to Initial Filtering Criteria (IFC), and the routing may be triggered by a service identifier (such as "IPTV service") indicated in the service request, or by a more particular service identifier such as "CoD IPTV service" or "LTV IPTV service." Therefore, the service request of the UE may carry a service identifier.

Mode 2: The service request is routed to the SCF by means of a Public Service Identifier (PSI). In this case, the Request URI is a PSI, and complies with the routing rules of the PSI.

After receiving the service request, the SCF handles service logic, for example, judges whether the user is entitled to access the requested service, and selects a PSS content server. The SCF may select the PSS content server according to different conditions. The selection conditions may include content identifier, UE capability information, user preference information, distribution of media content requested by the user in different PSS content servers, or state of PSS content server (such as load state information), or any combination thereof.

In this embodiment, the SCF selects an MCF according to one or more types of information specified above.

The SCF may judge whether the service requested by the user is the service provided by this domain or the service provided by other domains. If the service requested by the user is the service provided by this domain, the SCF may serve as a SIP proxy to process services and forward the service request; or serve as a SIP B2B User Agent (UA) to terminate the SIP session and initiate a new session. If the service requested by the user is the service provided by other domains, the SCF may perform possible service logic processing, for example, judge the service authorization; and forward the service request.

For the scenario in which the user accesses services of other domains, see Embodiment 6.

In step S505, the SCF forwards the SIP service request to the MCF.

In step S510, the MCF sends an RTSP SETUP message to the MDF.

According to the received SIP service request message, the MCF constructs the corresponding RTSP service request message, and sends the RTSP service request message to the MDF.

The RTSP service request message is an RTSP SETUP message, or is a combination of the RTSP SETUP message and the RTSP PLAY message. If the SDP in the SIP service request includes multiple media components, the MCF sends multiple RTSP SETUP messages and/or RTSP PLAY messages to the MDF. The RTSP PLAY message may be sent on different occasions, for example, by the UE, or by the MCF after the SIP ACK is received, which is detailed in the following embodiments.

The RTSP URL in the RTSP SETUP message may be obtained in many modes. If the UE service request carries RTSP URL parameter information; or if the SIP request carries no RTSP URL information, the MCF needs to determine the URL information. For example, the MCF selects the PSS content server according to the content identifier and determines the RTSP URL information.

The MCF may select the PSS content server according to different conditions. The selection conditions may include content identifier, UE capability information, user preference information, distribution of media content requested by the user in different PSS content servers, or state of PSS content server (such as load state information), or any combination thereof. In this embodiment, the MCF selects an MDF according to one or more types of information specified above, namely, selects a PSS content server.

Before sending the SETUP message, the MCF may obtain the content description information through an RTSP Describe message optionally, and obtain the capability information of the PSS content server through an RTSP OPTIONS message.

In step S520, the MDF returns an RTSP 200 OK response to the MCF.

The MDF determines parameters such as SessionID, source address, and server port "server-por", and returns an RTSP 200 OK message.

In step S525, the MCF returns a SIP 200 OK response to the SCF.

According to the received RTSP 200 OK response, the MCF constructs the corresponding SIP 200 OK response and returns it to the SCF.

The SIP 200 OK response carries SDP response information, for example, parameters of the RTSP content control channel (IP address and/or port number), and/or parameters of the RTP content delivery channel (IP address and/or port). The parameters of the content control channel may be MCF parameters or MDF parameters, depending on whether the created media control channel is directed to the MCF or the MDF. In this embodiment, it is assumed that the created media control channel is directed to the MCF. The parameters of the content delivery channel are MDF parameters.

The response carries the parameters of the RTSP content control channel, for example, RTSP URL, and SessionID.

The response may carry information that instructs the UE to adjust the RTSP state, for example, carry an instruction (such as network-side Pipeline instruction), or carry the RTSP state that should be set by the UE directly. The information may be carried through a property (such as a=fmtp:rtsp h-state=READY) of the SDP response message. The specific state may be any state of the RTSP state machine, for example, Init/Ready/Playing/Recording.

The response may carry the RTSP parameter information such as CSeq information, thus instructing the UE to send the CSeq parameter of the RTSP message in the future. The information may be carried through a property of the SDP response message.

The response may carry capability information of the PSS content server, for example, information indicating support of fast content switch or support of Pipeline. The capability information may be carried through a property of the SDP response message.

In step S530, the SCF forwards a SIP 200 OK response to the UE.

The SCF forwards a SIP 200 OK message to the UE through Core IMS. The P-CSCF interacts with a Resource and Admission Control Subsystem (RACS) to reserve resources.

In step S535 and S540, the UE returns an ACK message.

The UE sends an ACK message through Core IMS.

In step S545, the UE sends an RTSP PLAY message, requesting playing media streams.

The UE sends an RTSP PLAY message, requesting playing the requested media content.

As described above, the RTSP media control channel may be created between the UE and the MCF, or between the UE and the MDF, depending on the parameters of the RTSP media control channel in the response. In this embodiment, it is assumed that the RTSP media control channel is created between the UE and the MCF.

The UE sets a local RTSP state. If the SIP 200 OK response carries RTSP state indication information, for example, an RTSP PLAY indication which indicates that the network has sent an RTSP PLAY message; or carries the RTSP state directly. The UE may set the local RTSP state according to such information. If the response message carries no such information, the UE may judge the state that should be set according to the service logic.

The UE sets the local RTSP parameters. If the SIP 200 OK response carries the RTSP parameter information such as CSeq parameter information, the UE may set the parameter information corresponding to the local RTSP protocol according to the parameter information. If the response message carries no such information, the UE may decide the RTSP parameters at its own discretion.

According to RTP channel information (such as IP address and port) carried in the SIP 200 OK response, the UE creates a content delivery channel for transmitting and receiving media streams.

According to the SessionID and the RTSP URL carried in the SIP 200 OK response, the UE creates a content control channel, and sends an RTSP PLAY message to request playing of media streams.

If the response message carries capability information of the PSS content server, for example, information indicating support of fast content switch or support of Pipeline, where the information is carried through an SDP property or a SIP header field, the UE may obtain the capability information of the PSS content server, and the capability information serves as a basis of future actions of the UE.

In this embodiment, the UE sends an RTSP PLAY message which requests playing media streams, and the RTSP PLAY message may be sent by an MCF/PTF. The following embodiment describes a scenario in which the PTF sends an RTSP PLAY message.

In steps S550 and S555, the MCF forwards an RTSP PLAY message to the MDF, and receives an RTSP 200 OK response.

If the RTSP content control channel is created between the UE and the MDF directly, this step is optional.

The MCF may terminate the RTSP session of the UE, and create a new RTSP session with the MDF; or serve as an RTSP agent to forward the RTSP message of the UE to the MDF.

In step S560, the MCF forwards an RTSP 200 OK response to the UE.

Now the session setup process is completed and the UE receives the media content.

It should be noted that although the UE capability/user preference, media server selection, service triggering, RTSP state indication, and RTSP protocol parameter information are described in Embodiment 1, they are applicable to other embodiments as well.

Figure 6:
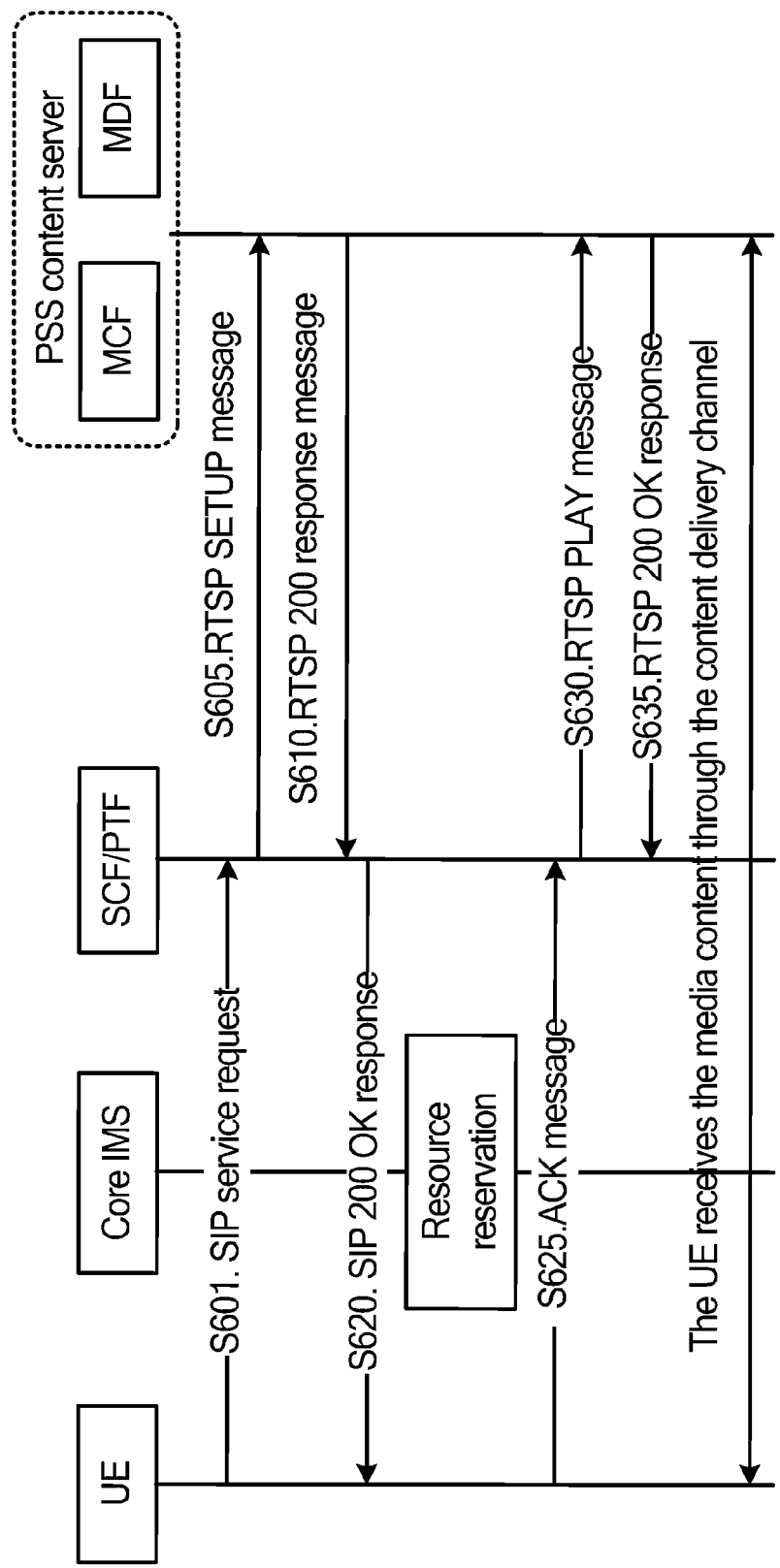
FIG. 6 is a flowchart of a method for creating a CoD service in Embodiment 5 of the present invention.

FIG. 6 is a flowchart of a method for creating a CoD service in Embodiment 5 of the present invention.

In this embodiment, for brevity of description, the system based on Embodiment 3 of the present invention is selected, the PTF 1 is deployed on the SCF 6, the media control channel is set up between the UE 2 and the media server 3, and the PTF 1 sends the first PLAY message as a request for playing the media streams. The detailed steps are as follows.

In step S601, the UE sends a SIP service request to request for a CoD service. Step S601 in this embodiment is the same as step S501 in Embodiment 1.

In step S605, the SCF sends an RTSP SETUP message to the PSS content server.

According to the received SIP service request message, the SCF constructs the corresponding RTSP service request message, and sends it to the PSS content server.

The RTSP service request message is an RTSP SETUP message, or is a combination of the RTSP SETUP message and the RTSP PLAY message. If the SDP in the SIP service request includes multiple media components, the SCF sends multiple RTSP SETUP messages and/or RTSP PLAY messages to the PSS content server. The RTSP PLAY message may be sent on different occasions, for example, sent after the UE receives the SIP 200 OK response, as described in Embodiment 4; or sent after the SCF receives a SIP ACK message, as described in this embodiment; or sent after the SETUP message is sent, such as the Pipeline mode.

The RTSP URL in the RTSP SETUP message may be obtained in many modes. If the UE service request carries RTSP URL parameter information; or if the SIP request carries no RTSP URL information, the SCF needs to determine the URL information. For example, the SCF selects the PSS content server according to the content identifier and determines the RTSP URL information.

The SCF may select the PSS content server according to different conditions. The selection conditions may include content identifier, UE capability information, user preference information, distribution of media content requested by the user in different PSS content servers, or state of PSS content server (such as load state information), or any combination thereof.

In step S610, the PSS content server returns an RTSP 200 OK response to the SCF.

The PSS content server determines the parameters such as SessionID, source address, and server port "server-por", and returns an RTSP 200 OK message.

In step S620, the SCF returns a SIP 200 OK response to the UE.

According to the received RTSP 200 OK response, the SCF constructs the corresponding SIP 200 OK response and returns it to the UE.

The response carries SDP response information, for example, parameters of the RTSP content control channel (IP address and/or port number), and/or parameters of the RTP content delivery channel (IP address and/or port). In this embodiment, parameter information of the content control channel and/or the content delivery channel is parameter information of the PSS content server.

The response carries the parameters of the RTSP content control channel, for example, RTSP URL, and SessionID.

The response may carry information that instructs the UE to adjust the RTSP state, for example, carry an instruction (such as network-side Pipeline instruction), or carry the RTSP state that should be set by the UE directly. The information may be carried through a property of the SDP response message. The specific state may be any state of the RTSP state machine, for example, Init/Ready/Playing/Recording. The instruction or state information (a=fmtp:rtsph-state=PLAYing) in this embodiment is different from that in Embodiment 4. The UE sets the RTSP state to PLAYing accordingly. In this state, the UE may choose not to send the RTSP PLAY message requesting playing the media streams any more.

The response may carry the RTSP parameter information such as CSeq information, thus instructing the UE to send the CSeq parameter of the RTSP message in the future. The information may be carried through a property of the SDP response message.

The response may carry capability information of the PSS content server, for example, information indicating support of fast content switch or support of Pipeline. The information may be carried through a property of the SDP response message. The SCF may obtain the capability information of the PSS content server through an RTSP OPTIONS message.

The P-CSCF interacts with a Resource and Admission Control Subsystem (RACS) to reserve resources.

Like in Embodiment 4 of the present invention, the UE performs the corresponding local operations according to the response after receiving the response.

The UE sets the local RTSP state. If the SIP 200 OK response carries RTSP state indication information, for example, an RTSP PLAY indication which indicates that the network has sent an RTSP PLAY message; or carries the RTSP state directly. The UE may set the local RTSP state according to such information. If the response message carries no such information, the UE may judge the state that should be set according to the service logic.

The UE sets the local RTSP parameters. If the SIP 200 OK response carries the RTSP parameter information such as CSeq parameter information, the UE may set the parameter information corresponding to the local RTSP protocol according to the parameter information. If the response message carries no such information, the UE may decide the RTSP parameters at its own discretion.

According to RTP channel information (such as IP address and port) carried in the SIP 200 OK response, the UE creates a content delivery channel for transmitting and receiving media streams.

According to the SessionID and the RTSP URL carried in the SIP 200 OK response, the UE creates a content control channel, and sends an RTSP PLAY message to request playing of media streams.

If the response message carries capability information of the PSS content server, for example, information indicating support of fast content switch or support of Pipeline, where the information is carried through an SDP property or a SIP header field, the UE may obtain the capability information of the PSS content server, and the capability information serves as a basis of future actions of the UE.

In step S625, the UE returns an ACK message.

The UE sends an ACK message through Core IMS.

In steps S630 and S635, the SCF sends an RTSP PLAY message to the PSS content server, and receives an RTSP 200 OK response.

The SCF sends an RTSP PLAY message to the PSS content server, requesting playing the media streams; and receives the 200 OK response.

The UE receives the media content through the content delivery channel.

Before or after the UE receives the media content through the content delivery channel, an additional step of setting up a content control channel between the UE and the server may occur. Through the content control channel, the media content transmitted on it can be controlled.

It should be noted that the step of setting up the content control channel is optional and may occur before or after the UE receives the media content through the content delivery channel. Therefore, this step is not illustrated in FIG. 6. The omission of this step does not affect the protection scope of the present invention.

It should be noted that in Embodiment 4 and Embodiment 5 of the present invention, the sending of the RTSP PLAY message is described below.

As described above, the RTSP PLAY message that requests playing media streams may be sent by the UE, or sent by a network-side entity PTF.

The network sends the RTSP PLAY message after the PTF sends the RTSP SETUP message (for example, in the Pipeline mode) or after the PTF receiving the ACK message.

Regardless of the occasion of sending the RTSP PLAY message:

When the UE sends a SIP service request, the service request may carry an indication which instructs the network-side PTF or the UE to send an RTSP PLAY message that requests playing media streams.

When the PTF handles the SIP service request, the PTF may decide whether to send the PLAY message according to the indication carried in the service request from the UE or the local configuration.

When the PTF returns a SIP 200 OK response, the response may carry an indication of sending the RTSP PLAY message from the network side (the indication may be the message has not been sent, the message has been sent, or the message will be sent after the ACK message is received), and/or the response may carry the RTSP state "Playing" directly. After receiving the response, the UE sets the local RTSP state to Playing, without the need of sending the RTSP PLAY message which requests playing media streams.

Figure 7:
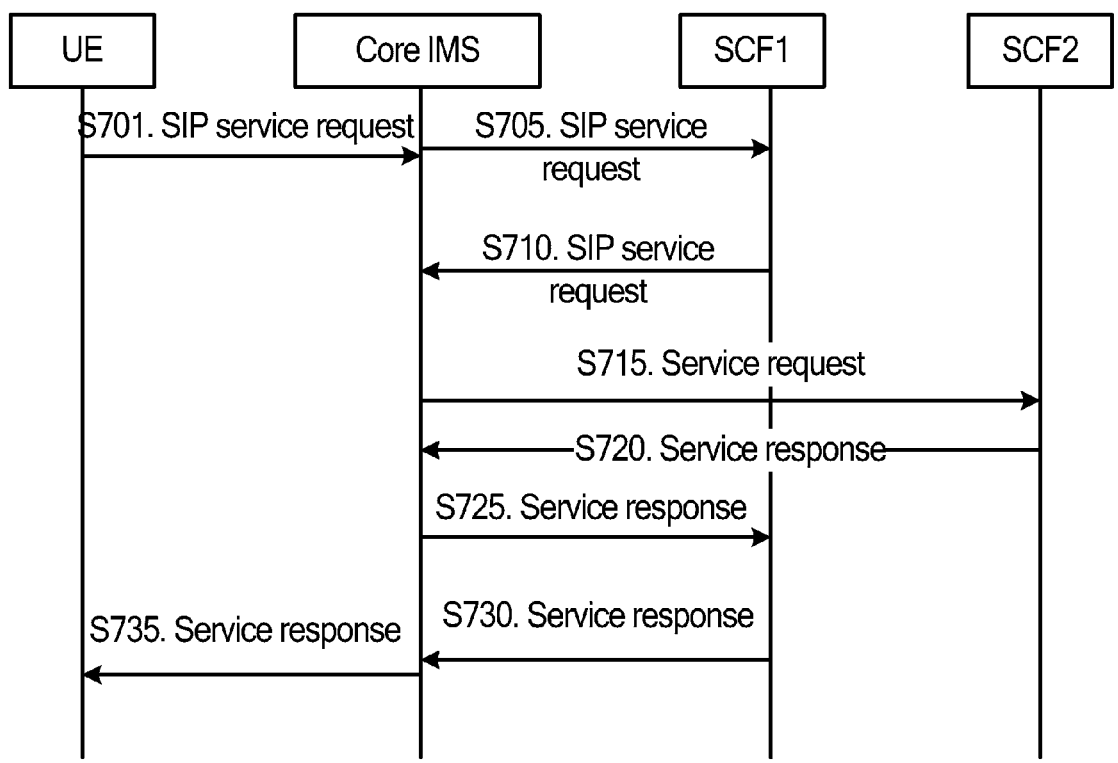
FIG. 7 is a flowchart of a method for creating a CoD service when a user accesses a service which is not subscribed in home domain in Embodiment 6 of the present invention.

FIG. 7 is a flowchart of a method for creating a CoD service when a user accesses a service which is not subscribed in home domain in Embodiment 6 of the present invention.

The scenarios of the foregoing method include scenarios where the user accesses services of other domains in the home domain, or the user accesses the service of the visited domain in the visited domain, or the user access the service of the non-home domain and non-visited domain in the visited domain.

In step S701, the UE sends a SIP service request to request a CoD service.

The service request is the same as that in Embodiment 1, but the routing mode of the SIP service request may differ.

In this embodiment, the Request URI is a PSI. In this case, the S-CSCF1 routes the request to the SCF1 according to IFC. The routing may be triggered by the Request URI or a service identifier, which serves as a basis for judging whether to access a service which is not subscribed in home domain.

The SCF1 handles the service request, for example, possible service logic processing such as service authorization judging, and then forwards the service request. If non-home area SCF does not exist, the SCF1 terminates the service request.

The service request is routed to the non-home area SCF in the normal PSI routing mode.

In steps S705, S710, and S715, the SIP service request is routed to the SCF2 in a PSI routing mode.

This embodiment illustrates only one of the PSI routing modes.

In step S720, the SCF2 performs service logic control, for example, obtains necessary service parameters, or selects the proper media server, and returns a service response.

In step S725, the service response is routed to the SCF1.

The SCF1 may be reserved in the SIP session path to implement service control functions such as statistics of the programs watched on the UE and watching duration, and real-time charging control.

In steps S730 and S735, the SCF1 forwards the service response to the UE.

Figure 8:
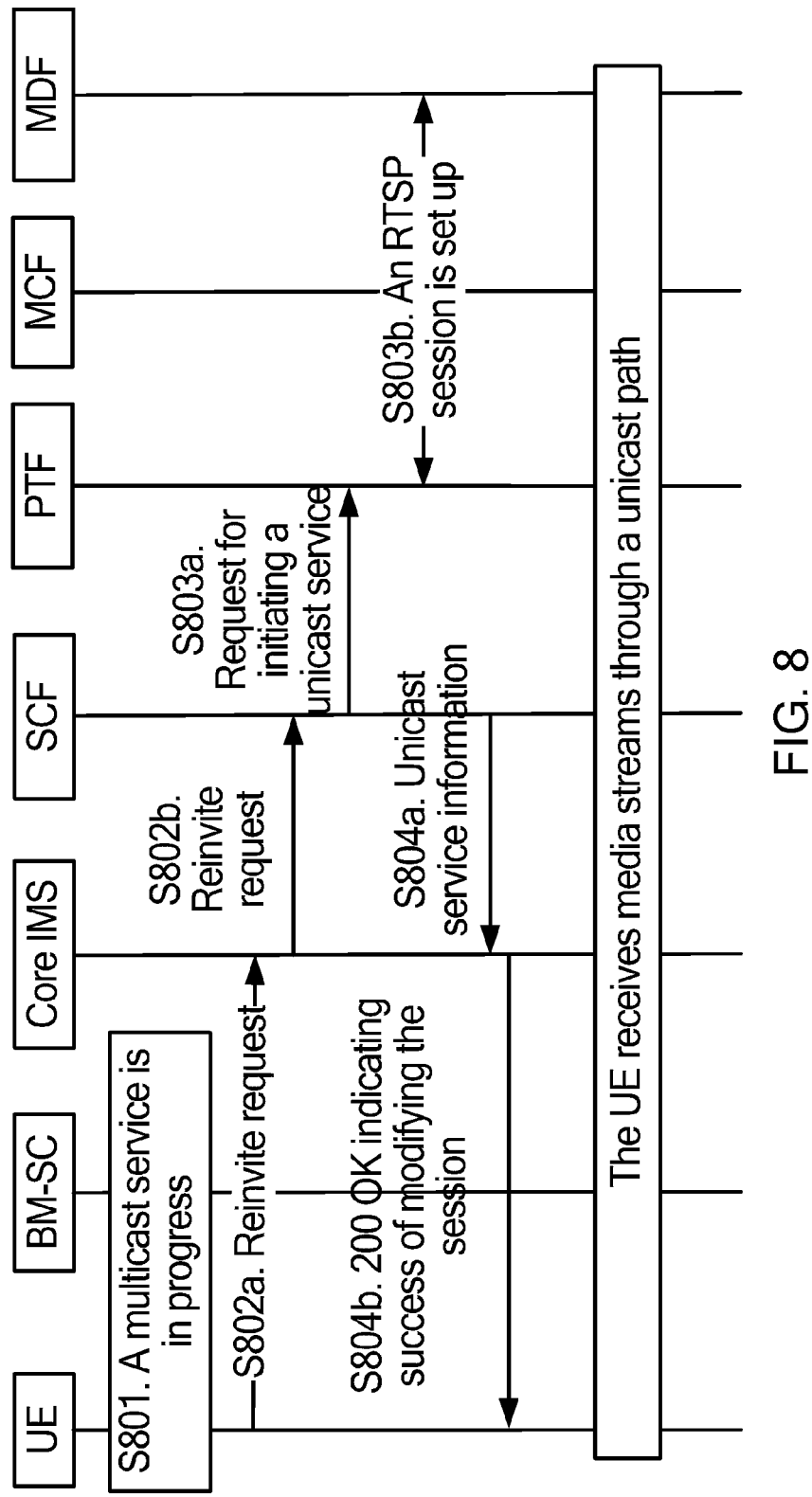
FIG. 8 is a flowchart of a method of handover from multicast Live Television (LTV) to unicast LTV in Embodiment 7 of the present invention.

FIG. 8 is a flowchart of a method of handover from multicast LTV to unicast LTV in Embodiment 7 of the present invention.

A typical scenario of this embodiment is handover from a multicast LTV service to a multicast LTV with Trick Mode, or to multicast LTV without Trick Mode which is provided through unicast.

In step S801, the multicast service is set up and is in progress.

In step S802a, the UE sends a Reinvite request.

The UE initiates the VCR operations such as suspending and fast reverse, and initiates handover from a multicast channel to a unicast channel. The UE sends a Reinvite message that carries an identifier of setting up a unicast channel (the need of setting a unicast channel may also be identified by information required for setting up the unicast channel or information required for RTSP control, or the Reinvite message carries an XML identifier). In the case that the unicast channel is selected directly, the Reinvite message needs to carry the playing channel information, start point of playing, and scope of playing.

The information about the channel currently bearing a unicast service may be carried in a SIP message. Alternatively, the information is obtained by the SCF, for example, obtained through a channel handover result reporting process.

In step S802b, the Core IMS forwards the Reinvite request to the SCF.

In step S803a, after receiving the Reinvite request, the SCF sends a unicast service request to set up a unicast session.

After receiving the Reinvite request, the SCF determines the requirement of setting up a unicast service according to the information in the request. As a B2B UA, the SCF sends a new unicast service request, and correlates the request with two SIP sessions.

In step S803b, the PTF sets up an RTSP session through the MCF and the MDF.

In step S804a, the SCF returns a 200 OK response that carries the unicast service information and indicates success of modifying the session.

In step S804b, the Core IMS forwards the 200 OK response to the UE.

The UE receives media streams through a unicast path, and performs VCR operations.

In this embodiment, the PTF is a stand-alone logical entity. In practice, as illustrated in the system architecture, the PTF may be deployed on the SCF or the MCF. When the PTF is deployed on the MCF, the unicast LTV session reuses the existing multicast LTV session between the UE and the SCF, and the SCF sets up a SIP session between the SCF and the MCF. When the PTF is deployed on the SCF, the unicast LTV session reuses the existing multicast LTV session between the UE and the SCF.

Figure 9:
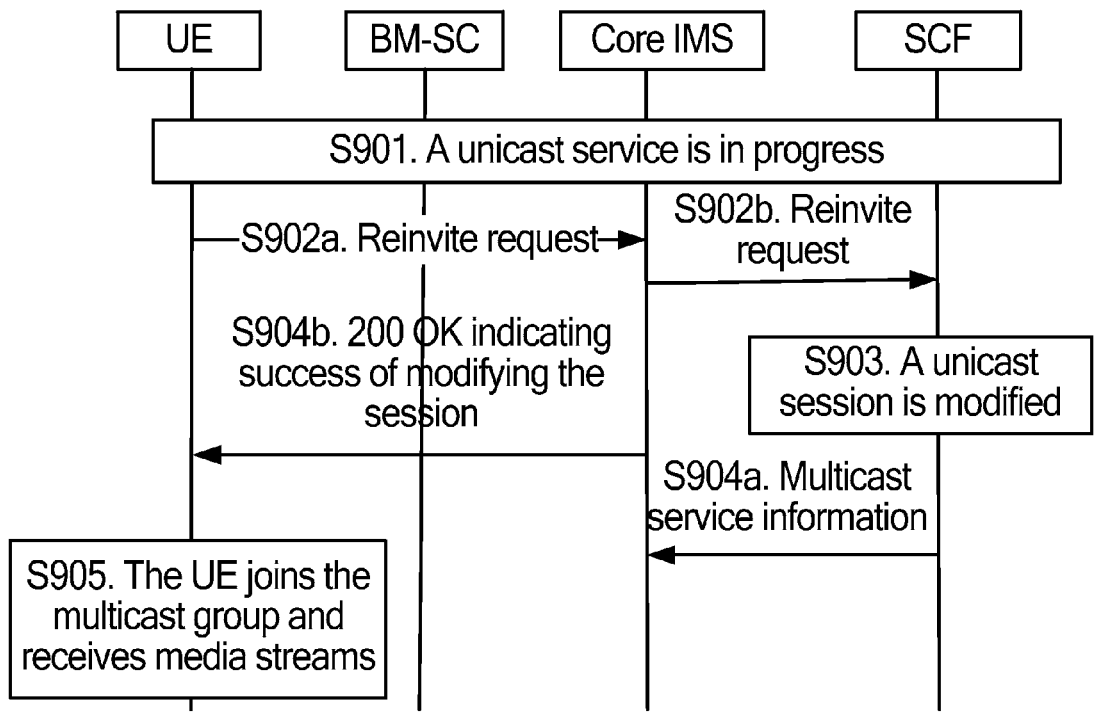
FIG. 9 is a flowchart of a method of handover from unicast LTV to multicast LTV in Embodiment 8 of the present invention.

FIG. 9 is a flowchart of a method of handover from unicast LTV to multicast LTV in Embodiment 8 of the present invention.

A typical scenario of this embodiment is handover from a multicast LTV with Trick Mode which is provided through unicast or a multicast LTV without Trick Mode, to a multicast LTV service.

In step S901, the unicast service is set up and is in progress.

In step S902a, the UE sends a Reinvite request.

The UE sends a Reinvite message that carries information required for setting up a multicast service, for example, channel identifier, and multicast address. The multicast service information may be carried in a SIP message or obtained by the SCF.

In step S902b, the Core IMS forwards the Reinvite request to the SCF.

In step S903, the SCF modifies the unicast session after receiving the Reinvite request.

After receiving the Reinvite request, the SCF determines the requirement of handing over to the multicast service according to the information in the request. As a B2BUA, the SCF sends a Reinvite request, for example, deactivates the unicast channel, or releases the unicast channel.

In step S904a, the SCF returns a 200 OK response that carries the multicast service information and indicates success of modifying the session.

In step S904b, the Core IMS forwards the 200 OK response to the UE.

In step S905, the UE joins the multicast group and receives media streams.

In this embodiment, the PTF is a stand-alone logical entity. In practice, as illustrated in the system architecture, the PTF may be deployed on the SCF or the MCF. When the PTF is deployed on the MCF, the multicast LTV session reuses the existing unicast LTV session between the UE and the SCF, and the SIP session between the SCF and the MCF is released or deactivated. When the PTF is deployed on the SCF, the multicast LTV session reuses the existing unicast LTV session between the UE and the SCF.

Figure 10:
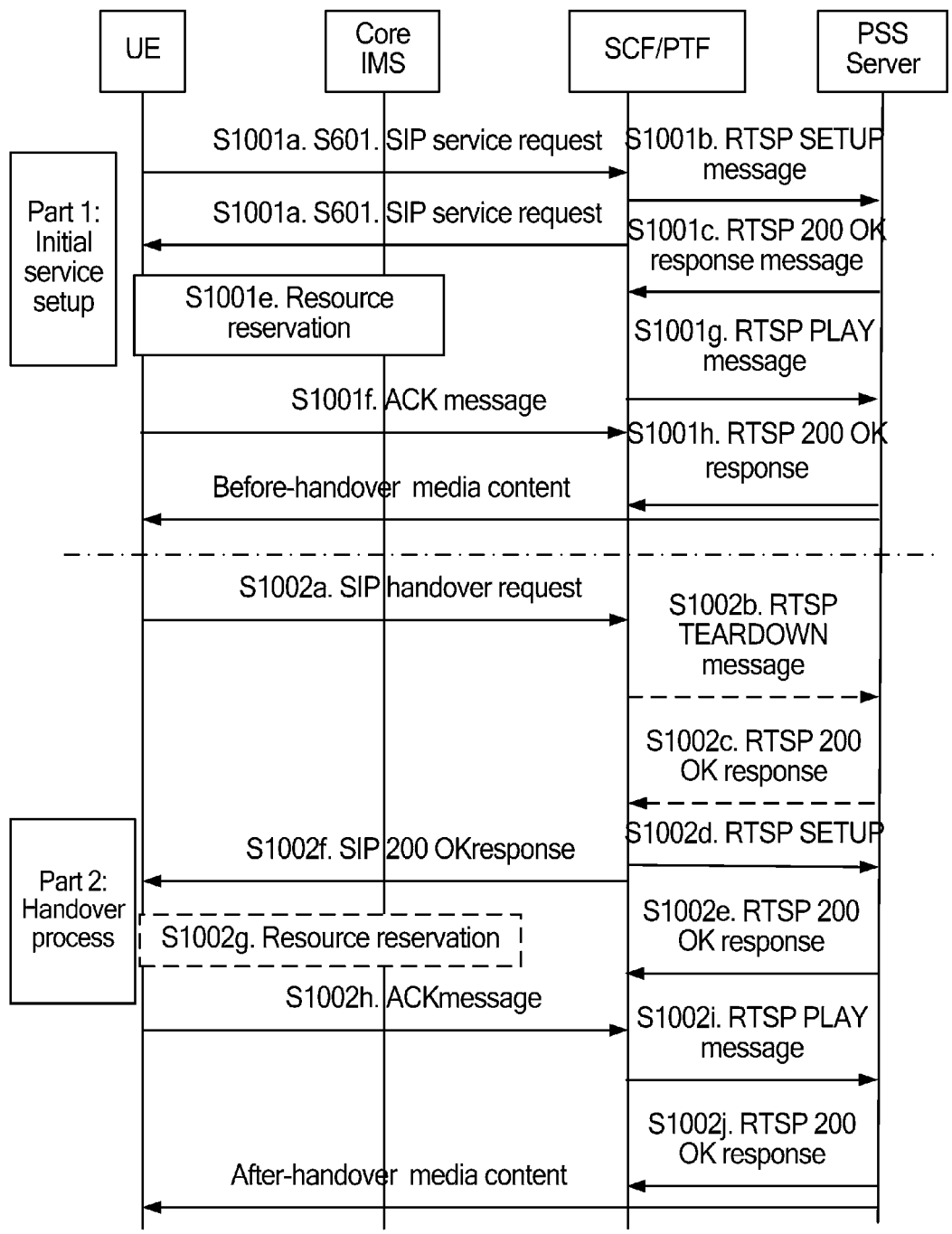
FIG. 10 is a flowchart of a unicast-to-unicast handover method in Embodiment 9 of the present invention.

FIG. 10 is a flowchart of a unicast-to-unicast handover method in Embodiment 9 of the present invention.

The system put forward in Embodiment 3 is taken as an example in this embodiment, namely, it is assumed that the PTF is deployed on the SCF.

This embodiment is divided into two parts.

Part 1: Steps S1001a-S1001m, which are a normal unicast session setup process and are the same as the counterpart steps in Embodiment 5.

Part 2: The UE sends a handover request to the SCF, requesting changing the content being accessed. The SCF processes the handover request, as detailed below.

Step S1002a: The UE sends a SIP handover request message, for example, SIP Re-INVITE message or SIP Update message, which carries the identifier of the content to which the UE will hand over (for example, the identifier is carried in a header field, or in a message body), IP address and port for receiving and transmitting media on the UE side, and codec information.

Step S1002b: The SCF sends an RTSP TEARDOWN message to the media server, requesting releasing the RTSP session and terminate the delivery of media content.

Step S1002c: The media server returns an RTSP 200 OK response.

Step S1002d: The SCF sends an RTSP SETUP message to the media server, requesting setting up an RTSP session. The RTSP SETUP message carries the after-handover content identifier, IP address and port for receiving and transmitting media on the UE side, and codec information.

Step S1002e: The media server accepts the request, returns an RTSP 200 OK response, and allocates an RTSP session identifier. The RTSP response carries IP address and port for receiving and transmitting media on the media server side, and codec information.

If the before-handover media content and the after-handover media content are on the same media server, steps S1002b-S1002c are optional. The PTF may modify the parameters of the UE and the PSS content server through the SETUP message, without releasing the existing RTSP session.

Steps S1002f-S1002j are the same as steps S1001d-S1001h. After completion of step S1002j, the media server sends the after-handover media content to the UE, and the handover is completed.

It should be noted that in this embodiment, if the after-handover media content is on another media server, steps S1002d, S1002e, S1002i, and S1002j are about interaction between the SCF and the other media server.

Meanwhile, all embodiments of the present invention are independent of the specific access mode, and the specific access mode shall not be construed as limitation to the present invention.

The present invention discloses a system and a method that enables a UE to enjoy streaming services under control of the IMS on the basis of the existing specifications of TISPAN and 3GPP. The present invention enables the IMS system to serve as both mobile terminal and fixed terminal to provide control, and enhance the user experience significantly. Moreover, the technical solution under the present invention minimizes the impact on the traditional PSS and MBMS systems, thus protecting existing investments of the service provider and saving the operation costs of the service provider.

After reading the foregoing embodiments, those skilled in the art are clearly aware that the present invention may be implemented through hardware, or through software in addition to a necessary universal hardware platform. The technical solution under the present invention may be embodied as a software product. The software product may be stored in a non-volatile storage medium (such as CD-ROM, USB flash disk, or mobile hard disk), and may incorporate several instructions that enable a computer device (such as personal computer, server, or network device) to perform the method specified in any embodiment of the present invention.

The above descriptions are merely preferred embodiments of the present invention, but are not intended to limit the scope of the present invention. Any modification, equivalent replacement, or improvement made without departing from the principles of the present invention shall fall within the scope of the present invention.

What is claimed is:

1. A method for creating a Content-on-Demand (CoD) service, the method comprising:
    receiving a Session Initiation Protocol (SIP) service request sent by a User Equipment (UE);
    converting the SIP service request into a Real-Time Streaming Protocol (RTSP) service request;
    sending the RTSP service request to a server;
    receiving an RTSP service response sent by the server, the RTSP service response being responsive to the RTSP service request;
    converting the RTSP service response into a SIP service response responsive to the SIP service request;
    sending the SIP service response to the UE to create the CoD service between the UE and the server, wherein the SIP service response carries RTSP content control channel parameter information and realtime transport protocol (RTP) content delivery channel parameter information;

receiving an RTSP PLAY message sent by the UE, the RTSP PLAY message requesting playing of media streams; and forwarding the RTSP PLAY message to the server.

2. The method for creating a CoD service according to claim 1, wherein the SIP service request carries an indication of sending the RTSP PLAY message.

3. The method for creating a CoD service according to claim 1, wherein the SIP service request is a request for a service subscribed in a home domain of the UE, and the method further comprises:

routing the SIP service request to a Service Control Function (SCF) of the home domain using Initial Filtering Criteria (IFC) or Public Service Identifier (PSI); and forwarding, by the SCF, the SIP service request.

4. The method for creating a CoD service according to claim 3, wherein:

the IFC is triggered by a service identifier corresponding to the SIP service request; and the PSI comprises a Request Uniform Resource Identifier (URI).

5. The method for creating a CoD service according to claim 1, wherein the SIP service request is a request for a service which is not subscribed in a home domain of the UE, the method further comprises:

routing the SIP service request to a Service Control Function (SCF) of the home domain by means of Initial Filtering Criteria (IFC); and forwarding, by the SCF, the SIP service request to a Core IP Multimedia Subsystem (IMS).

6. The method for creating a CoD service according to claim 5, wherein the IFC is triggered by a service identifier corresponding to the SIP service request or a Request Uniform Resource Identifier (URI).

7. The method for creating a CoD service according to claim 1, wherein, before the sending the RTSP service request to the server, the method further comprises:

selecting a server that provides services for the UE according to capability information of the UE and/or user preference information.

8. The method for creating a CoD service according to claim 1, wherein, if the SIP service response sent to the UE carries RTSP parameter information, the UE updates RTSP parameters of the UE according to the RTSP parameter information.

9. The method for creating a CoD service according to claim 1, wherein creating the CoD service between the UE and the server comprises sending, by a Protocol Transforming Function (PTF), the RTSP PLAY message to the server as a request for delivering media content.

10. The method for creating a CoD service according to claim 1, wherein creating the CoD service between the UE and the server comprises:

switching a multicast Live Television (LTV) service to a unicast LTV service at the time of creating the CoD service between the UE and the server; or switching a unicast LTV service to a multicast LTV service after the CoD service is created between the UE and the server; or switching a unicast CoD service to another unicast CoD service after the CoD service is created between the UE and the server.

11. The method for creating a CoD service according to claim 1, wherein creating the CoD service between the UE and the server comprises switching a multicast Live Television (LTV) service to a unicast LTV service at the time of creating the CoD service between the UE and the server, wherein switching the multicast LTV service to the unicast LTV service comprises:

receiving, by a Service Control Function (SCF), a service handover request sent by the UE and sending the SIP service request to a Protocol Transforming Function (PTF) if the SCF is separated from the PTF, wherein the SIP service request is converted by the PTF into the RTSP service request and sent to the server to request creation of the unicast LTV service; or receiving the service handover request sent by the UE and sending the RTSP service request to the server if the SCF is combined with the PTF, wherein the RTSP service request requests creating the unicast LTV service.

12. The method for creating a CoD service according to claim 1, wherein creating the CoD service between the UE and the server comprises switching a unicast LTV service to a multicast LTV service after the CoD service is created between the UE and the server, wherein switching the unicast LTV service to the multicast LTV service comprises:

receiving, by a Service Control Function (SCF), a service handover request sent by the UE and sending the SIP service request to a Protocol Transforming Function (PTF) if the SCF is separated from the PTF, wherein the SIP service request is converted by the PTF into the RTSP service request and sent to the server to request teardown or deactivation of the unicast LTV service; or receiving the service handover request sent by the UE and sending the RTSP service request to the server if the SCF is combined with the PTF, wherein the RTSP service request requests tearing down or deactivating the unicast LTV service.

13. The method for creating a CoD service according to claim 1, wherein creating a CoD service between the UE and the server comprises switching a unicast CoD service to another unicast CoD service after the CoD service is created between the UE and the server, wherein switching the unicast CoD service to another unicast CoD service comprises:

receiving, by a Service Control Function (SCF), a service handover request sent by the UE and sending the SIP service request to a Protocol Transforming Function (PTF) if the SCF is separated from the PTF, wherein the SIP service request is converted by the PTF into an RTSP TEARDOWN request and an RTSP SETUP request and sent to the server to request handover from the unicast CoD service to the other unicast CoD service; or receiving the service handover request sent by the UE and sending the RTSP TEARDOWN request and the RTSP SETUP request to the server if the SCF is combined with the PTF, wherein the request requests handing the unicast CoD service over to the other unicast CoD service.

14. A system for creating a Content-on-Demand (CoD) service, comprising:

a Protocol Transforming Function (PTF), configured to convert a Session Initiation Protocol (SIP) message into a Real Time Streaming Protocol (RTSP) message; and a content server, configured to receive and process an RTSP service message and send a media stream to a User Equipment (UE)

wherein the PTF comprises a processor and a non-transitory computer readable storage medium that stores programming for execution by the processor, the programming including instructions to:

convert a Session Initiation Protocol (SIP) message into a Real Time Streaming Protocol (RTSP) message or convert an RTSP message into a SIP message;

convert a SIP service request received from the UE into an RTSP service request and send the RTSP service request to the content server, and convert an RTSP service response received from the content server into a SIP service response and send the SIP service response to the UE;

receive an RTSP PLAY message sent by the UE and forward the RTSP PLAY message to the content server;

wherein the content server comprises a processor and a non-transitory computer readable storage medium that stores programming for execution by the processor, the programming including instructions to receive and process an RTSP service message and send a media stream to a User Equipment (UE); and wherein the SIP service response carries RTSP content control channel parameter information, and Realtime Transport Protocol (RTP) content delivery channel parameter information.

15. The system for creating a CoD service according to claim 14, wherein the instructions, when executed by the processor, cause the processor to select a server that provides services for the UE, according to the SIP service request received from the UE.

16. A Protocol Transforming Function (PTF), comprising:
a processor; and
a non-transitory computer readable storage medium storing instructions stored thereon which, when executed by the processor, cause the processor to:

receive a Session Initiation Protocol (SIP) service request sent by a user equipment (UE);

convert the SIP service request into a real time streaming protocol (RTSP) service request, and send the RTSP service request to a content server;

receive an RTSP service response responsive to the RTSP service request sent from the content server;

convert the RTSP service response into a SIP service response responsive to the SIP service request, wherein the SIP service response carries RTSP content control channel parameter information, and Realtime Transport Protocol, RTP, content delivery channel parameter information;

send the SIP service response to the UE; and receive an RTSP PLAY message sent from the UE and forward the RTSP PLAY message to the content server.

17. The PTF according to claim 16, wherein the instructions, when executed by the processor, cause the processor to select the content server that provides services for the UE, according to the SIP service request.

* * * * *